US012494208B2

(12) United States Patent
Bruhn

(10) Patent No.: US 12,494,208 B2
(45) Date of Patent: Dec. 9, 2025

(54) FRAME LOSS CONCEALMENT FOR A LOW-FREQUENCY EFFECTS CHANNEL

(71) Applicant: DOLBY INTERNATIONAL AB, Dublin (IE)

(72) Inventor: Stefan Bruhn, Sollentuna (SE)

(73) Assignee: DOLBY INTERNATIONAL AB, Dublin (IE)

( * ) Notice: Subject to any disclaimer, the term of this patent is extended or adjusted under 35 U.S.C. 154(b) by 240 days.

(21) Appl. No.: 18/008,446

(22) PCT Filed: Jun. 10, 2021

(86) PCT No.: PCT/EP2021/065613

§ 371 (c)(1),
(2) Date: Dec. 6, 2022

(87) PCT Pub. No.: WO2021/250167

PCT Pub. Date: Dec. 16, 2021

(65) Prior Publication Data

US 2023/0343344 A1 Oct. 26, 2023

Related U.S. Application Data

(60) Provisional application No. 63/193,974, filed on May 27, 2021, provisional application No. 63/037,673, filed on Jun. 11, 2020.

(51) Int. Cl.
*G10L 19/005* (2013.01)
*G10L 19/26* (2013.01)

(52) U.S. Cl.
CPC ............ *G10L 19/005* (2013.01); *G10L 19/26* (2013.01)

(58) Field of Classification Search
CPC .............................. G10L 19/005; G10L 19/26
See application file for complete search history.

(56) References Cited

U.S. PATENT DOCUMENTS 5,067,158 A * 11/1991 Arjmand ................ G10L 19/08
704/219
5,884,010 A 3/1999 Chen
(Continued)

FOREIGN PATENT DOCUMENTS

JP 2017097326 A * 6/2017 ......... G10L 19/0204
RU 2420815 C2 6/2011
(Continued)

OTHER PUBLICATIONS

"Introduction to Digital Filters with Audio Applications", Julius O. Smith III, (CCRMA), Department of Music, Stanford University, Stanford, California 94305 USA, 2007. retrieved Dec. 17, 2024 at https://www.dsprelated.com/freebooks/filters/Pole_Zero_Analysis_I.html (Year: 2007).*
(Continued)

*Primary Examiner* — Daniel C Washburn
*Assistant Examiner* — Paul J. Mueller

(57) ABSTRACT

A method of generating a substitution frame for a lost audio frame of an audio signal is presented. The method may comprise determining an audio filter based on samples of a valid audio frame preceding the lost audio frame. The method may comprise generating the substitution frame based on the audio filter and the samples of the valid audio frame preceding the lost audio frame. The method may be advantageously applied to a low frequency effects (LFE) channel of a multi-channel audio signal.

3 Claims, 2 Drawing Sheets

(56) References Cited

U.S. PATENT DOCUMENTS

| | | | | |
|---|---|---|---|---|
| 6,456,968 | B1 * | 9/2002 | Taniguchi | G06T 9/007 704/229 |
| 6,826,527 | B1 | 11/2004 | Unno | |
| 7,587,315 | B2 | 9/2009 | Unno | |
| 7,590,525 | B2 | 9/2009 | Chen | |
| 7,693,710 | B2 | 4/2010 | Jelinek | |
| 7,930,176 | B2 | 4/2011 | Chen | |
| 8,255,207 | B2 | 8/2012 | Vaillancourt | |
| 8,600,738 | B2 | 12/2013 | Zhan | |
| 9,263,049 | B2 | 2/2016 | Elias | |
| 9,485,686 | B2 | 11/2016 | Gundu | |
| 9,712,930 | B2 | 7/2017 | Mustiere | |
| 9,847,086 | B2 * | 12/2017 | Bruhn | G10L 19/02 |
| 9,881,621 | B2 | 1/2018 | Huang | |
| 2002/0016939 | A1 * | 2/2002 | Bonifas | H04L 1/203 714/704 |
| 2003/0009325 | A1 * | 1/2003 | Kirchherr | G10L 19/20 704/E19.041 |
| 2008/0046249 | A1 * | 2/2008 | Thyssen | G10L 19/0204 704/262 |
| 2009/0006084 | A1 | 1/2009 | Chen | |
| 2009/0281805 | A1 * | 11/2009 | LeBlanc | G10L 21/0208 704/E15.039 |
| 2009/0307541 | A1 * | 12/2009 | Razazian | H03M 13/2707 714/701 |
| 2013/0144632 | A1 * | 6/2013 | Sung | G10L 19/0017 704/503 |
| 2014/0088974 | A1 | 3/2014 | Mittal | |
| 2015/0051905 | A1 * | 2/2015 | Gao | G10L 19/125 704/207 |
| 2017/0263263 | A1 | 9/2017 | Kovesi | |
| 2017/0316788 | A1 | 11/2017 | Norvell | |
| 2018/0358023 | A1 | 12/2018 | Sasaki | |
| 2019/0005966 | A1 * | 1/2019 | Lecomte | G10L 19/032 |
| 2019/0005967 | A1 | 1/2019 | Lecomte | |
| 2019/0088263 | A1 * | 3/2019 | Zopf | H04L 65/764 |
| 2019/0156840 | A1 | 5/2019 | Schnabel | |
| 2020/0066288 | A1 | 2/2020 | Lecomte | |
| 2020/0118573 | A1 | 4/2020 | Bruhn | |
| 2022/0293112 | A1 | 9/2022 | Tyagi | |

FOREIGN PATENT DOCUMENTS

| | | | | |
|---|---|---|---|---|
| RU | 2712093 | C1 | 1/2020 | |
| WO | 20080108080 | W | 9/2008 | |
| WO | WO-2008108080 | A1 * | 9/2008 | G10L 19/005 |
| WO | 2012158159 | A1 | 11/2012 | |
| WO | 2015063045 | A1 | 5/2015 | |

OTHER PUBLICATIONS

Xiang, Kai, Shihong Chen, and Yuanyuan Zeng. “Improved Frame Error Concealment Algorithm Based on Transform-Domain Mobile Audio Codec.” The Open Electrical & Electronic Engineering Journal 8.1 (2014). (Year: 2014).*

Jarvinen, K., et al. “GSM enhanced full rate speech codec.” 1997 IEEE International Conference on Acoustics, Speech, and Signal Processing. vol. 2. IEEE, 1997. (Year: 1997).*

Geiser, Bernd, and Peter Vary. “Joint pre-echo control and frame erasure concealment for VoIP audio codecs.” 2009 17th European Signal Processing Conference. IEEE, 2009. (Year: 2009).*

Blommer, Michael A., and Gregory H. Wakefield. “Pole-zero approximations for head-related transfer functions using a logarithmic error criterion.” IEEE Transactions on Speech and Audio Processing 5.3 (1997): 278-287. (Year: 1997).*

Moya, Aránzazu Robles, Dipl-Ing F. Pflug, and Ing T. Fingscheidt. “Survey of Error Concealment Schemes for Real-Time Audio Transmission Systems.” (2012). (Year: 2012).*

Klapuri, Anssi. “Multipitch analysis of polyphonic music and speech signals using an auditory model.” IEEE transactions on audio, speech, and language processing 16.2 (2008): 255-266. (Year: 2008).*

Välimäki, Vesa, and Joshua D. Reiss. “All about audio equalization: Solutions and frontiers.” Applied Sciences 6.5 (2016): 129. (Year: 2016).*

Gournay, P. “Improved Packet Loss Recovery Using Late Frames for Prediction-Based Speech Coders” Apr. 2003, IEEE.

* cited by examiner

FRAME LOSS CONCEALMENT FOR A LOW-FREQUENCY EFFECTS CHANNEL

CROSS-REFERENCE TO RELATED APPLICATIONS

This application is a U.S. National Stage application under U.S.C. 371 of International Application No. PCT/EP2021/065613, filed on 10 Jun. 2021 (reference: D20058WO01), which claims priority of the following priority applications: U.S. provisional application 63/037,673 (reference: D20058USP1), filed 11 Jun. 2020 and U.S. provisional application 63/193,974 (reference: D20058USP2), filed 27 May 2021, each of which are hereby incorporated by reference.

TECHNOLOGY

The present disclosure relates generally to a method and apparatus for frame loss concealment for a low-frequency effects (LFE) channel. More specifically, the present disclosure relates to frame loss concealment which is based on linear predictive coding (LPC) for a LFE channel of a multi-channel audio signal. The presented techniques may be e.g. applied to 3GPP IVAS coding.

While some embodiments will be described herein with particular reference to that disclosure, it will be appreciated that the present disclosure is not limited to such a field of use and is applicable in broader contexts.

BACKGROUND

Any discussion of the background art throughout the disclosure should in no way be considered as an admission that such art is widely known or forms part of common general knowledge in the field.

LFE is the low-frequency effects channel of multi-channel audio, such as e.g. in 5.1 or 7.1 audio. The channel is intended to drive the subwoofer of loudspeaker playback systems for such multi-channel audio.

As the term LFE implies, this channel is supposed to deliver only bass-information, a typical upper frequency limit is 120 Hz.

However, this frequency limit may not always be very sharp, meaning that it may happen in practice that the LFE channel contains even some higher frequency component up to e.g. 400 or 700 Hz. Whether such components will have a perceptual effect when rendered to the loudspeaker system may depend on the actual frequency characteristics of the subwoofer.

Multi-channel audio may in some cases also be rendered via stereo headphones. Particular rendering techniques are used to generate an equivalent sound experience in that case as if the multi-channel audio was listened over a multi loudspeaker system. This is the case even for the LFE channel, where proper rendering techniques make sure that the sound experience of the LFE channel is as close to the experience in case a subwoofer system had been used for playback.

Given that the LFE channel has typically only very limited frequency content, it can be encoded and transmitted with relatively low bit rate. One suitable coding technique for the LFE is transform-based coding using modified discrete cosine transform (MDCT). With this technique, it is e.g. possible to represent the LFE at bit rates of around 2000-4000 bits per second.

One particular situation in multi-channel audio transmissions especially over wireless channels is that the transmission may be error prone. Transmission is typically packet based and a transmission error may result in that one or several complete coded frames of the multi-channel audio are erased. There are so-called packet or frame loss concealment techniques employed by a multi-channel audio decoding system that aim at rendering the effects of lost audio frames as inaudible as possible.

For the regular signal channels of the multi-channel audio, there are well-established frame loss concealment techniques. A range of suitable techniques is for instance part of the 3GPP EVS codec [3GPP TS 26.447].

For the MDCT encoded LFE channel, in principle, the same techniques could be applied. For instance, it would be possible to reuse the MDCT coefficients from the most recent valid audio frame, and to use these coefficients after gain scaling (attenuation) and sign prediction or randomization. The EVS standard offers also other techniques such as a technique that reconstructs the missing audio frame in time domain according to a sinusoidal approach.

A major problem with applying these state-of-the art techniques to the LFE channel is that they are not designed or optimized for the very low frequency content. While they are very powerful for audio channels with regular frequency content, applying them to the LFE channel rather results in annoying low-frequency rumble.

It is hence an objective of this disclosure to describe a novel technique that overcomes the problems and limitations of prior art frame loss concealment techniques applied to the LFE channel. The application range of the novel method may however not be limited to LFE channels.

SUMMARY

In accordance with a first aspect of the present disclosure, a method of generating a substitution frame for a lost audio frame of an audio signal is presented. The method may comprise determining an audio filter based on samples of a valid audio frame preceding the lost audio frame. The method may comprise generating the substitution frame based on the audio filter and the samples of the valid audio frame preceding the lost audio frame. The step of generating the substitution frame based on the audio filter and the samples of the valid audio frame may include initializing a filter memory of the audio filter with the samples of the valid audio frame. The method may comprise determining a modified audio filter based on the audio filter. The modified audio filter may replace the audio filter and the step of generating of the substitution frame based on the audio filter may include generating the substitution frame based on the modified audio filter and the samples of the valid audio frame.

The audio filter may be an all-pole filter. The audio filter may be a linear predictive coding (LPC) synthesis filter. The audio filter may be derived from an all-pass filter operated on at least a sample of a valid frame. The method may comprise determining the audio filter based on a denominator polynomial of a transfer function of the all-pass filter.

The step of determining the modified audio filter may include bandwidth sharpening. The bandwidth sharpening may be applied such that a duration of an impulse response of the modified audio filter is extended with regard to a duration of an impulse response of the audio filter. The bandwidth sharpening may be applied such that a distance between a pole of the modified audio filter and the unit circle is reduced compared to a distance between a corresponding pole of the audio filter and the unit circle. The bandwidth sharpening may be applied such that a pole of the modified audio filter with the largest magnitude is equal to 1 or at least close to 1. The bandwidth sharpening may be applied such that a frequency of a pole of the modified audio filter with the largest magnitude is equal to a frequency of a pole of the audio filter with the largest magnitude.

The method may comprise determining the magnitudes and frequencies of the poles of the audio filter using a root-finding method. The bandwidth sharpening may be applied such that the magnitudes of the poles of the modified audio filter are set equal to 1 or at least close to 1, wherein the frequencies of the poles of the modified audio filter are identical to the frequencies of the poles of the audio filter. A magnitude of a pole of the modified audio filter may be set equal to 1 or at least close to 1 only if a magnitude of the corresponding pole of the audio filter has a magnitude exceeding a certain threshold value.

The method may comprise determining filter coefficients of the audio filter. The method may comprise applying the bandwidth sharpening using a bandwidth sharpening factor such that $S_\gamma(z)=S(^z/_\gamma)$, wherein $S_\gamma$ denotes a transfer function of the modified audio filter, S denotes a transfer function of the audio filter, and $\gamma$ denotes the bandwidth sharpening factor. The method may comprise generating the substitution frame based on the filter coefficients of the audio filter, the samples of the valid audio frame preceding the lost audio frame, and the bandwidth sharpening factor $\gamma$. The bandwidth sharpening factor may be determined in an iterative procedure by stepwise incrementing and/or decrementing the bandwidth sharpening factor. The method may comprise checking whether a pole of the modified audio filter lies within the unit circle by converting polynomial coefficients of the modified audio filter to reflection coefficients. At this, the converting the polynomial coefficients of the modified audio filter to reflection coefficients may be based on the backward Levinson recursion. The bandwidth sharpening factor may be determined such that a pole of the modified audio filter with the largest magnitude is moved as close to the unit circle as possible, and, at the same time, all poles of the modified audio filter are located within the unit circle. The substitution frame may be generated using the equation $\hat{x}(n)=\sum_{i=1}^{P} a_i \cdot \gamma_i \hat{x}(n-i)$, $n \geq 0$, wherein $a_i$ denotes the filter coefficients of the audio filter, P denotes the order of the audio filter, $\gamma$ denotes the bandwidth sharpening factor, $\hat{x}(-1 \ldots -P)$ denotes the filter memory of the audio filter, and $\hat{x}(n)$, $n \geq 0$ denote substitution samples of the substitution frame.

The method may comprise determining filter coefficients of the audio filter applying the bandwidth sharpening by reducing the distance of a pair of line spectral frequencies representing the audio filter coefficients, thereby generating modified line spectral frequencies. The method may comprise deriving the coefficients of the modified audio filter from the modified line spectral frequencies. The method may comprise generating the substitution frame based on the filter coefficients of the modified audio filter and the samples of the valid audio frame preceding the lost audio frame.

The lost audio packet may be associated with a low frequency effect LFE channel of a multi-channel audio signal. In particular, the lost audio packet may have been transmitted over wireless channel from a transmitter to a receiver. The method may be carried out at the receiver.

The method may comprise downsampling the samples of the valid audio frame before generating substitution samples of the substitution frame. The method may comprise upsampling the substitution samples of the substitution frame after generating the substitution frame.

A plurality of audio frames may be lost, and the method may comprise determining a first modified audio filter by scaling audio filter coefficients of the audio filter using a first bandwidth sharpening factor. The method may comprise determining a second modified audio filter by scaling said audio filter coefficients using a second bandwidth sharpening factor. The method may comprise generating substitution frames based on the first modified audio filter for the first M lost audio frames. The method may comprise generating substitution frames based on the second modified audio filter for the (M+1)th lost audio frame and all following lost audio frames such the audio signal is damped for the latter frames.

The method may comprise splitting the audio signal into a first subband signal and a second subband signal. The method may comprise generating a first subband audio filter for the first subband signal. The method may comprise generating first subband substitution frames based on the first subband audio filter. The method may comprise generating a second audio filter for the second subband signal. The method may comprise generating second subband substitution frames based on the second subband audio filter. The method may comprise generating the substitution frame by combining the first and the second subband substitution frames.

The audio filter may be configured to operate as a resonator. The resonator may be tuned on the samples of the valid audio frame preceding the lost audio frame. The resonator may initially be excited with at least one sample among the samples of the valid audio frame preceding the lost audio frame. The substitution frame may be generated by using ringing of the resonator for extending the at least one sample into the lost audio frame.

In accordance with a second aspect of the present disclosure, a system is presented. The system may comprise one or more processors and a non-transitory computer-readable medium storing instructions that, when executed by the one or more processors, cause the one or more processors to perform operations of the above-described method.

In accordance with a third aspect of the present disclosure, a non-transitory computer-readable medium is presented. Said non-transitory computer-readable medium may store instructions that, when executed by one or more processors, cause the one or more processors to perform operations of the above-described method.

BRIEF DESCRIPTION OF THE DRAWINGS

Example embodiments of the disclosure will now be described, by way of example only, with reference to the accompanying drawings in which.

DESCRIPTION OF EXAMPLE EMBODIMENTS

Figure 1:
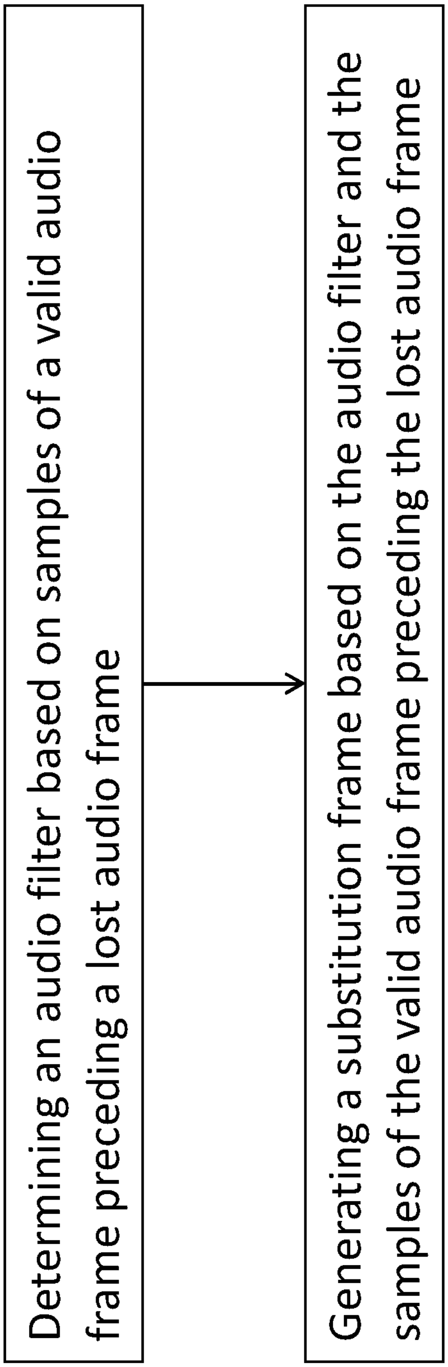
FIG. 1 illustrates a flowchart of an example process of frame loss concealment.

One main idea of this disclosure is to extrapolate the samples of the lost audio frame from the most recent valid audio samples by running a resonator. The resonator is tuned on the most recent valid audio samples and is then operated to extend the audio samples into the lost audio frame. As an example, if the most recent valid audio samples are a sinusoid of frequency $f_0$ and phase $\varphi$, then a suitable resonator would be an oscillator that is tuned to extend that sinusoid into the lost audio frame.

In this example, the most recent valid signal could be expressed as $$x(n) = a\sin\left(2\pi\cdot\frac{f_0}{f_s}\cdot n+\varphi\right),\ n<0.$$

The extrapolated samples generated by the resonator would then be:

$$\hat{x}(n) = a\sin\left(2\pi\cdot\frac{f_0}{f_s}\cdot n+\varphi\right),\ n\geq 0.$$

In these equations, a is the sinusoidal amplitude, $f_s$ is the sampling frequency.

One possible realization of this resonator is the following all-pass filter $$H(z)=\frac{1-z^{-1}\cdot 2\cos 2\pi\frac{f_0}{f_s}+z^{-2}}{1-z^{-1}\cdot 2\cos 2\pi\frac{f_0}{f_s}+z^{-2}}.$$

As nominator and denominator of this filter are identical, the resulting transfer function would be one and hence, the filter would pass through the most recent valid audio samples without modification. However, to generate the extrapolated samples, only the denominator of the filter would be used, turning it into an oscillator. The extrapolated samples would then be generated as follows:

$$\hat{x}(n)=-2\cos 2\pi\frac{f_0}{f_s}\cdot\hat{x}(n-1)+\hat{x}(n-2),\ n\geq 0.$$

The initial values for $\hat{x}(-1)$ and $\hat{x}(-2)$ would be the two most recent valid samples x(−1) and x(−2).

In other words, the extrapolated samples may be constructed as the ringing of the resonator filter that has originally been excited with the most recent audio samples, which thus determine the initial filter state memories, and then letting the filter ring (or oscillate) for itself, i.e. without further (non-zero) input samples.

The described sample extrapolation approach would be possible if the signal can be sufficiently well approximated with a sinusoid. However, this would still require identifying the sinusoidal frequency $f_0$ and the resonance frequency of the resonator.

A more general approach that overcomes the limitation to a single sinusoid and also solves the problem to determine the resonance frequencies of the resonator, is to apply a linear predictive (LPC) approach. Linear predictive synthesis filter ringing has traditionally been used in frame-based Analysis-by-Synthesis speech coding systems. Here, the LPC filter excitation of a current frame is calculated by taking into account the synthesis filter ringing of the preceding frame. LPC synthesis filter ringing has also been used to extrapolate a few samples in case of ACELP codec mode switching where a few future samples are unavailable [3GPP TS 26.445].

As with the all-pass filter above, a filterH(z) is constructed as:

$$H(z)=A(z)\cdot\frac{\sigma}{A(z)}.$$

Here, A(z) is the LPC analysis filter generating the linear predictive error signal. In this exemplary formulation of H(z), A(z) is a transversal filter.

$$\frac{\sigma}{A(z)}$$

is the LPC synthesis filter reconstructing the speech signal from the prediction error signal or some other suitable excitation signal.

$$\frac{\sigma}{A(z)}$$

is a recursive filter (all-pole filter). σ is a scaling factor of the excitation signal to be chosen such that the power of the synthesize signal matches the power of the original signal. σ may be optional and/or set to 1 in some implementations.

The approach to extrapolate signal samples is alike the case of the above-described oscillator:

$$\hat{x}(n)=\Sigma_{i=1}^{P}a_i\hat{x}(n-i),n\geq 0.$$

The initial values for $\hat{x}(-1)$ through $\hat{x}(-P)$ are the most recent valid samples x(−1) through x(−P). P is the order of the LPC synthesis filter.

Notably, analysis filter A(z) may be generated/determined with conventional approaches such as the Levinson-Durbin approach. The all-pass filter H(z) can be constructed from A(z) as described above. In case of frame loss, the synthesis filter part of H(z), viz., LPC synthesis filter $$S(z)=\frac{\sigma}{A(z)},$$

can be used to construct the substitute frame for the lost frame.

It is further notable that the LPC approach solves the problem to determine the resonance frequencies of the resonator, as explained in the following: One property of LPC analysis, well known from speech coding, is that the frequency response of the corresponding LPC synthesis filter matches the speech formants. Generally speaking, this means that the synthesis filter matches with its resonance frequencies the dominant spectral components (dominant frequencies) of the analyzed input signal. Hence, the LPC approach is suitable to determine a resonator with matching resonance frequencies.

A disadvantage with the LPC synthesis filter ringing approach is that the impulse response of the LPC synthesis filter is typically quite fast (approximately exponentially) decaying. The approach would hence not suffice to generate a substitution frame for a lost audio frame of 20 ms. In case of several successive lost frames, correspondingly, multiples of 20 ms of substitution signal would have to be generated. A typical LPC synthesis filter would already have faded out and not be able to produce a useful substitution signal.

To overcome this limitation, the LPC synthesis filter may not be used as such and as calculated using standard techniques like the Levinson/Durbin approach. Rather, by means of bandwidth sharpening, the filter is modified such that its poles are moved as close to the unit circle as possible, just still maintaining stability. According to one such approach, the poles of the LPC synthesis filter are calculated using a standard root-finding method. Then, given an original pole location $z_i = r_i \cdot e^{j\omega_i}$, the pole magnitude $r_i$ is replaced by a magnitude of 1, or at least close to 1. The effect of this operation is that the frequency of the pole is maintained while the filter response for the frequency of that pole $$f_i = f_s \cdot \frac{\omega_i}{2\pi}$$

is not fading out. A slight modification of the method is that only poles are moved towards the unit circle whose magnitude exceed a certain threshold of, e.g., 0.75.

A practical drawback of the described method may in some implementations be the numerical complexity required for the root-finding. One method avoiding that processing step is to take the given LPC synthesis filter and to modify it by a bandwidth sharpening factor $\gamma$ as follows:

$$S_\gamma(z) = S(z/\gamma).$$

This operation has the effect that the filter poles are all moved by the factor $\gamma$ towards the unit circle. However, as the pole locations are unknown, a given factor $\gamma$ may be too large, such that at least the pole with largest magnitude is moved to outside the unit circle, which results in an instable filter. It is thus possible, after application of a given factor $\gamma$ to check if the filter has become instable or if it is still stable. In case the filter is instable, a smaller $\gamma$ is chosen, otherwise a larger $\gamma$. This procedure can then be iteratively repeated (using nested interval techniques) until a bandwidth sharpening factor $\gamma$ is found for which the filter is very close to instability, but still stable.

Notably, other filter bandwidth sharpening techniques may also be used, such as line spectral frequency-based sharpening. In this technique the LPC filter coefficients are represented as line spectral frequency (pairs). The sharpening effect is achieved by reducing the distance of pairs of line spectral frequencies. If the distance is reduced to zero, this is identical with moving the poles of the filter to the unit circle or pushing the filter to the stability limit. The correspondingly modified filter, represented by the modified line spectral frequencies, can then again be represented by LPC coefficients that are obtained by a backwards conversion from the modified line spectral frequencies to modified LPC coefficients.

The above LPC-based approach may be summarized as follows: In a first step, an audio filter (which may be seen as a resonator) may be tuned-in on a previously received and/or reconstructed audio signal (such as e.g. an LFE audio signal). For example, the LPC coefficients $a_i$, i=1 . . . P, may be calculated. The tune-in on the previously received and/or reconstructed signal may be performed in such manner that the audio filter obtained at this step has characteristics (e.g., resonance frequencies) that are based on (e.g., that are derived from) the previously received and/or reconstructed signal.

Bandwidth sharpening of the corresponding LPC synthesis filter may be performed by using a modified synthesis filter $S_{crit}(z) = S(z/\gamma_{crit})$ where $\gamma_{crit}$ is chosen such that the LPC filter is at the stability limit. Alternatively, line spectral frequency-based sharpening can be used. The LPC synthesis filter memories may be initialized with the most recent samples of the previously received and/or reconstructed audio signal: $\hat{x}(-1 \ldots -P) = x(-1 \ldots -P)$. The substitution signal for a lost frame may then be determined based on the following formula: $\hat{x}(n) = \Sigma_{i=1}^{P} a_i \cdot \gamma_{crit}^{i} \hat{x}(n-i)$, $n \geq 0$. In other words, resonator ringing of the resonator may be used to reconstruct or estimate the substitution signal.

The filter stability check in above procedure can be done by converting the polynomial coefficients of the modified LPC synthesis filter to reflection coefficients. This can be done using the backward Levinson recursion. The reflection coefficients allow a straightforward stability test: if any of the absolute values of the reflection coefficients is greater or equal to 1, the filter is instable, otherwise it is ensured to be stable.

For implementation reasons it may be advantageous to carry out the above described operations in subsampled domain. Under the assumption that the LFE signal has no significant frequency content above 800 Hz, it is possible to carry out the described frame loss concealment operations in subsampled domain, e.g., using a sampling frequency of $f_s$=1600 Hz instead of an original sampling frequency of 48000 Hz. This allows for instance reducing the memory required for storing the preceding valid samples by a corresponding factor of 1/30=1600 Hz/48000 Hz. The complexity of certain numerical operations is reduced by the same factor. Under the assumption that the LFE signal is sufficiently bandlimited, no further filtering prior to subsampling is needed. However, during up-sampling to the original sampling frequency, after having computed the substitution samples, corresponding interpolation filtering, typically applying a linear phase low-pass filter, is necessary. The delay induced by the filter may be considered and a corresponding additional number of substitution samples has to be calculated.

It is notable, that an LPC filter order of P=20 has been found suitable in a practical implementation operated in a subsampled domain with sampling frequency $f_s$=1600 Hz.

Another factor to be taken into account in frame loss concealment of MDCT based coding is that the frame to be recovered may need to be prepared matching the particular realization of that (lapped) MDCT transform. This means that the substitution samples, after applying above described frame loss concealment technique, may be windowed and then converted into time folded domain. The time folded domain conversion may then be inverted, the resulting signal frame is then subjected to the time reversed window. Note that the time folding and unfolding can be combined to one step. After these operations, the recovered frame can be combined with the remainder of the previous (valid) frame, to produce the substitution samples for the erased frame. Depending on MDCT frame size and window shape and the mentioned interpolation filter, this may require reconstructing more samples with the described method than could be expected by the nominal stride or frame size of the coding system, which could e.g. be 20 ms.

A particular case is when several consecutive frames are lost in a row. In principle, the above-described processing remains unchanged if the frame loss is the second, third, etc., loss in a row. The preceding frame recovered by the described technique can just be taken as if it was a valid frame received without errors. Or, the ringing may be just extended into the next lost frame whereby the resonator or (modified) synthesis filter parameters are maintained from the initial calculation for the first frame loss. However, after very long bursts of frame losses (e.g. more than 10 consecutive frames corresponding to 200 ms) it is advantageous for a listener to start muting of the substitution signal. Otherwise, the listener might be confused by a seemingly endless substitution signal despite interrupted connection.

A particular inventive method suitable for muting is to modify the bandwidth sharpening factor $\gamma$ found according to the steps described above. While the found factor $\gamma$ would ensure the modified synthesis filter $S(^{Z}/_{\gamma})$ to produce a sustained substitution signal, for muting, $\gamma$ is further modified (scaled) to ensure proper attenuation. This has the effect that the poles of the modified synthesis filter are moved by the scaling factor inwards the unit circled and, accordingly, the synthesis filter response decays exponentially.

If, for instance, an attenuation (att_per_frame) of 3 dB per 20 ms frame (flen=0.02 s) is desired, and assuming that the synthesis filter operates at a sampling frequency of $f_s$=1600 Hz, the following scaling factor would be applied:

$$\alpha_{mute} = \sqrt[flen \cdot f_s]{10^{-att\_per\_frame/20}} = \sqrt[0.02 \cdot 1600]{10^{-3[dB]/20}}.$$

The resulting factor $\gamma_{mute}$ is the original $\gamma$ scaled with $\alpha_{mute}$, as follows:

$$\gamma_{mute} = \gamma \cdot \alpha_{mute}$$

It is to be noted that generally, muting should only be initiated after a very long burst of frame losses, e.g. after 10 consecutive frame losses. I.e. only then, $\gamma$ would be replaced by $\gamma_{mute}$.

The preceding embodiments of the invention are based on the assumption that the signal for which frame loss concealment is to be carried out is the LFE channel of a multichannel audio signal. However, analogous principles could be applied to any audio signals without bandwidth limitations. One obvious possibility is to carry out the operations in a fullband approach, at the nominal sampling frequency of the signal. However, this may run into practical difficulties, especially using the LPC approach. If the sampling frequency is 48 kHz, it may be challenging to find an LPC filter of sufficiently high order that can adequately represent the spectral properties of the signal to be extended. The challenges may be both numerical (for calculating an LPC filter of sufficiently high order) and conceptual. The conceptual difficulty may be that the low frequencies may require a longer LPC analysis window than the higher frequencies.

One effective way to address these challenges is to carry out the described operations in a subband/splitband approach. To that end, the initial fullband signal is split by a bank of analysis filters into a number of subband signals, each representing a partial frequency band. The splitband approach can be combined with using particular quadrature mirror filtering and subsampling (QMF approach), which gives advantages in terms of complexity and memory savings (due to the critical sampling). After analysis filter operation yielding the subband signals, the above-described frame loss concealment techniques can be applied to all subband signals in parallel. With this approach, it is especially possible to use a wider LPC analysis window for low frequency bands than for high frequency bands and thus to make the LPC approach frequency selective.

After frame loss concealment operations for the initial subbands, the subbands can be combined again to a fullband substitution signal. In case of QMF, the QMF synthesis also involves upsampling and QMF interpolation filtering.

Interpretation

Unless specifically stated otherwise, as apparent from the following discussions, it is appreciated that throughout the disclosure discussions utilizing terms such as "processing," "computing," "calculating," "determining", "analyzing" or the like, refer to the action and/or processes of a computer or computing system, or similar electronic computing devices, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one example embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The processing system may also encompass a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one or more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code. Furthermore, a computer-readable carrier medium may form, or be included in a computer program product.

In alternative example embodiments, the one or more processors operate as a standalone device or may be connected, e.g., networked to other processor(s), in a networked deployment, the one or more processors may operate in the capacity of a server or a user machine in server-user network environment, or as a peer machine in a peer-to-peer or distributed network environment. The one or more processors may form a personal computer (PC), a tablet PC, a Personal Digital Assistant (PDA), a cellular telephone, a web appliance, a network router, switch or bridge, or any machine capable of executing a set of instructions (sequential or otherwise) that specify actions to be taken by that machine.

Note that the term "machine" shall also be taken to include any collection of machines that individually or jointly execute a set (or multiple sets) of instructions to perform any one or more of the methodologies discussed herein.

Thus, one example embodiment of each of the methods described herein is in the form of a computer-readable carrier medium carrying a set of instructions, e.g., a computer program that is for execution on one or more processors, e.g., one or more processors that are part of web server arrangement. Thus, as will be appreciated by those skilled in the art, example embodiments of the present disclosure may be embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause the processor or processors to implement a method. Accordingly, aspects of the present disclosure may take the form of a method, an entirely hardware example embodiment, an entirely software example embodiment or an example embodiment combining software and hardware aspects. Furthermore, the present disclosure may take the form of carrier medium (e.g., a computer program product on a computer-readable storage medium) carrying computer-readable program code embodied in the medium.

The software may further be transmitted or received over a network via a network interface device. While the carrier medium is in an example embodiment a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present disclosure. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media may also take the form of acoustic or light waves, such as those generated during radio wave and infrared data communications. For example, the term "carrier medium" shall accordingly be taken to include, but not be limited to, solid-state memories, a computer product embodied in optical and magnetic media; a medium bearing a propagated signal detectable by at least one processor or one or more processors and representing a set of instructions that, when executed, implement a method; and a transmission medium in a network bearing a propagated signal detectable by at least one processor of the one or more processors and representing the set of instructions.

It will be understood that the steps of methods discussed are performed in one example embodiment by an appropriate processor (or processors) of a processing (e.g., computer) system executing instructions (computer-readable code) stored in storage. It will also be understood that the disclosure is not limited to any particular implementation or programming technique and that the disclosure may be implemented using any appropriate techniques for implementing the functionality described herein. The disclosure is not limited to any particular programming language or operating system.

Reference throughout this disclosure to "one example embodiment", "some example embodiments" or "an example embodiment" means that a particular feature, structure or characteristic described in connection with the example embodiment is included in at least one example embodiment of the present disclosure. Thus, appearances of the phrases "in one example embodiment", "in some example embodiments" or "in an example embodiment" in various places throughout this disclosure are not necessarily all referring to the same example embodiment. Furthermore, the particular features, structures or characteristics may be combined in any suitable manner, as would be apparent to one of ordinary skill in the art from this disclosure, in one or more example embodiments.

As used herein, unless otherwise specified the use of the ordinal adjectives "first", "second", "third", etc., to describe a common object, merely indicate that different instances of like objects are being referred to and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

It should be appreciated that in the above description of example embodiments of the disclosure, various features of the disclosure are sometimes grouped together in a single example embodiment, FIG., or description thereof for the purpose of streamlining the disclosure and aiding in the understanding of one or more of the various inventive aspects. This method of disclosure, however, is not to be interpreted as reflecting an intention that the claims require more features than are expressly recited in each claim. Rather, as the following claims reflect, inventive aspects lie in less than all features of a single foregoing disclosed example embodiment. Thus, the claims following the Description are hereby expressly incorporated into this Description, with each claim standing on its own as a separate example embodiment of this disclosure.

Furthermore, while some example embodiments described herein include some but not other features included in other example embodiments, combinations of features of different example embodiments are meant to be within the scope of the disclosure, and form different example embodiments, as would be understood by those skilled in the art. For example, in the following claims, any of the claimed example embodiments can be used in any combination.

In the description provided herein, numerous specific details are set forth. However, it is understood that example embodiments of the disclosure may be practiced without these specific details. In other instances, well-known methods, structures and techniques have not been shown in detail in order not to obscure an understanding of this description.

Thus, while there has been described what are believed to be the best modes of the disclosure, those skilled in the art will recognize that other and further modifications may be made thereto without departing from the spirit of the disclosure, and it is intended to claim all such changes and modifications as fall within the scope of the disclosure. For example, any formulas given above are merely representative of procedures that may be used. Functionality may be added or deleted from the block diagrams and operations may be interchanged among functional blocks. Steps may be added or deleted to methods described within the scope of the present disclosure.

Figure 2:
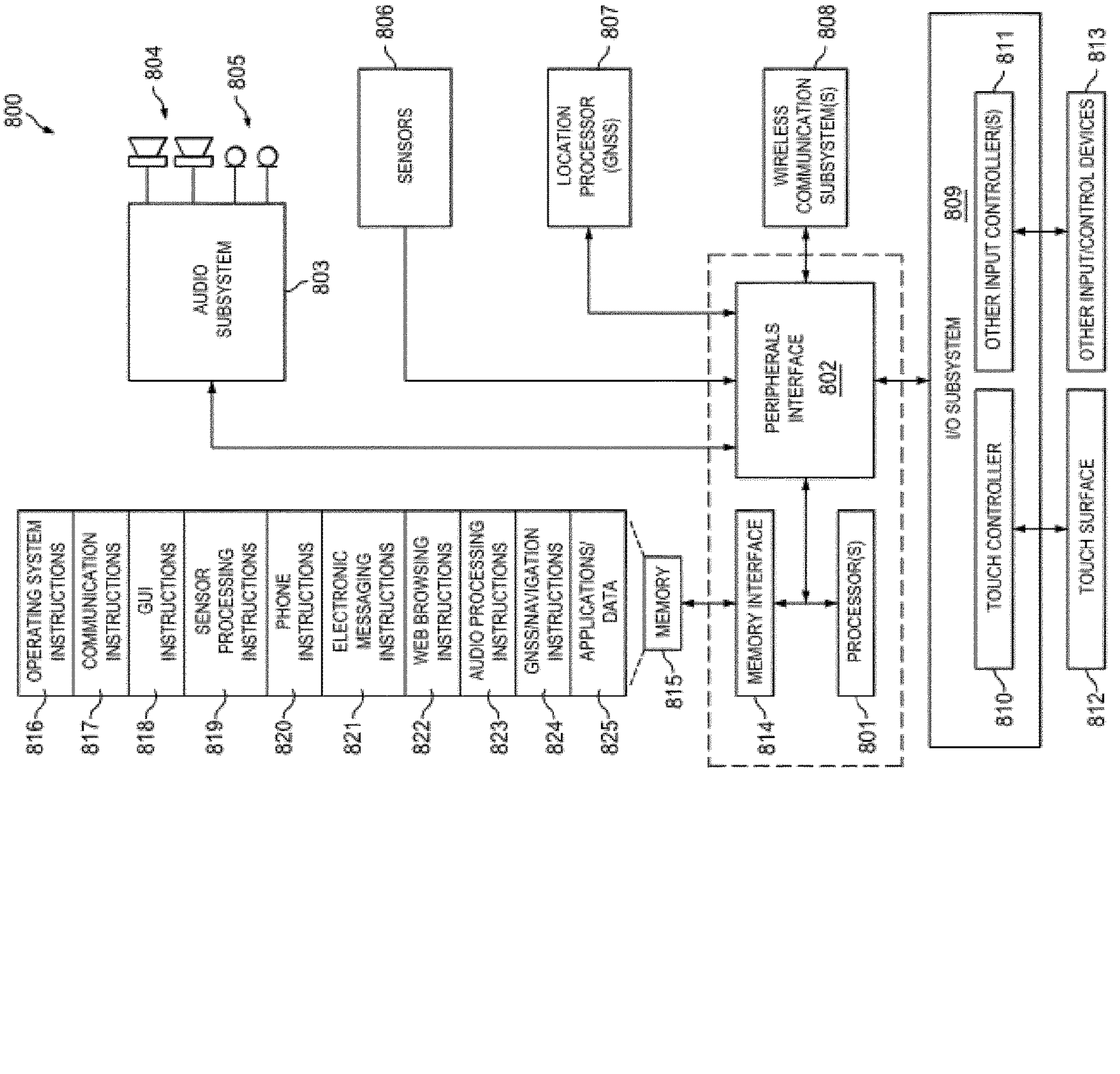
FIG. 2 illustrates an exemplary mobile device architecture for implementing the features and processes described within this document.

Finally, FIG. 1 illustrates a flowchart of an example process of frame loss concealment. This example process may be carried out e.g. by a mobile device architecture 800 depicted in FIG. 2. Architecture 800 can be implemented in any electronic device, including but not limited to: a desktop computer, consumer audio/visual (AV) equipment, radio broadcast equipment, mobile devices (e.g., smartphone, tablet computer, laptop computer, wearable device). In the example embodiment shown, architecture 800 is for a smart phone and includes processor(s) 801, peripherals interface 802, audio subsystem 803, loudspeakers 804, microphone 805, sensors 806 (e.g., accelerometers, gyros, barometer, magnetometer, camera), location processor 807 (e.g., GNSS receiver), wireless communications subsystems 808 (e.g., Wi-Fi, Bluetooth, cellular) and I/O subsystem(s) 809, which includes touch controller 810 and other input controllers 811, touch surface 812 and other input/control devices 813. Other architectures with more or fewer components can also be used to implement the disclosed embodiments.

Memory interface 814 is coupled to processors 801, peripherals interface 802 and memory 815 (e.g., flash, RAM, ROM). Memory 815 stores computer program instructions and data, including but not limited to: operating system instructions 816, communication instructions 817, GUI instructions 818, sensor processing instructions 819, phone instructions 820, electronic messaging instructions 821, web browsing instructions 822, audio processing instructions 823, GNSS/navigation instructions 824 and applications/data 825. Audio processing instructions 823 include instructions for performing the audio processing described in reference to FIG. 1.

Aspects of the systems described herein may be implemented in an appropriate computer-based sound processing network environment for processing digital or digitized audio files. Portions of the adaptive audio system may include one or more networks that comprise any desired number of individual machines, including one or more routers (not shown) that serve to buffer and route the data transmitted among the computers. Such a network may be built on various different network protocols, and may be the Internet, a Wide Area Network (WAN), a Local Area Network (LAN), or any combination thereof.

One or more of the components, blocks, processes or other functional components may be implemented through a computer program that controls execution of a processor-based computing device of the system. It should also be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, physical (non-transitory), non-volatile storage media in various forms, such as optical, magnetic or semiconductor storage media.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

Enumerated Example Embodiments

Various aspects and implementations of the present invention may also be appreciated from the following enumerated example embodiments (EEEs), which are not claims.

EEE1. A method of recovering a lost audio frame, comprising:

- tuning a resonator to samples of a valid audio frame preceding the lost audio frame;
- adapting the resonator to operate as an oscillator according to samples of the valid audio frame; and
- extending an audio signal generated by the oscillator into the lost audio frame. The resonator may correspond to the above-described audio filter H(z), whereas the oscillator may correspond to the above-described term $$S(z) = \frac{\sigma}{A(z)}.$$

EEE2. The method of EEE 1, wherein the resonator/oscillator combination is constructed using linear predictive (LPC) techniques and where the oscillator is realized as an LPC synthesis filter.

EEE3. The method of EEE 2, wherein the LPC synthesis filter is modified using bandwidth sharpening.

EEE4. The method of EEE 3, wherein the LPC synthesis filter is modified using a bandwidth sharpening factor $\gamma$, resulting in the following modified filter:

$$S_\gamma(z)=S(^z/_\gamma).$$

EEE5. The method of EEE 4, wherein the bandwidth sharpening factor $\gamma$ is selected such that the modified LPC synthesis filter is close to instability, but still stable.

EEE6. The method of any one of EEE 1-5, wherein the method is operated in subsampled domain.

EEE7. A method of recovering a frame from a sequence of consecutive audio frame losses, comprising:

- applying a first modified LPC synthesis filter using a sharpening factor $\gamma$ for an n-th consecutive frame loss, n being below a threshold M; and
- gradually muting other frame losses in the sequence using a second modified LPC synthesis filter using a further modified sharpening factor $\gamma_{mute}$ for a k-th consecutive frame loss, k being above or equal the threshold M, and where $\gamma_{mute}$ is the sharpening factor $\gamma$ scaled by a factor $\alpha_{mute}$.

EEE8. The method of EEE 7, wherein the threshold M and the scaling factor amute are chosen such that a muting behavior is achieved with an attenuation of 3 dB per 20 ms audio frame, starting from the 10th consecutive frame loss.

EEE9. The method of any of EEE 1-8, wherein the method is applied to the low frequency effect (LFE) channel of a multi-channel audio signal.

EEE10. A system comprising:

one or more processors; and a non-transitory computer-readable medium storing instructions that, when executed by the one or more processors, cause the one or more processors to perform operations of any EEE of EEE 1-9.

EEE11. A non-transitory computer-readable medium storing instructions that, when executed by one or more processors, cause the one or more processors to perform operations of any EEE of EEE 1-9.

The invention claimed is:

1. A method of generating a substitution frame for a lost audio frame of an audio signal, the method comprising:

determining an audio filter based on samples of a valid audio frame preceding the lost audio frame, wherein the audio filter is tuned on the samples of the valid audio frame preceding the lost audio frame;

modifying the audio filter to include bandwidth sharpening;

operating the audio filter as a resonator, wherein ringing of the resonator is initially excited with at least one of the samples of the valid audio frame preceding the lost audio frame;

generating the substitution frame based on the audio filter and the samples of the valid audio frame preceding the lost audio frame, wherein the substitution frame is generated by using ringing of the resonator for extending the at least one sample into the lost audio frame;

inserting the substitution frame into the audio signal; and rendering the audio signal with the substitution frame.

2. A system comprising:

one or more processors; and a non-transitory computer-readable medium storing instructions that, when executed by the one or more processors, cause the one or more processors to perform a method of generating a substitution frame for a lost audio frame of an audio signal, the method comprising:

determining an audio filter based on samples of a valid audio frame preceding the lost audio frame, wherein the audio filter is tuned on the samples of the valid audio frame preceding the lost audio frame;

modifying the audio filter to include bandwidth sharpening;

operating the audio filter as a resonator, wherein ringing of the resonator is initially excited with at least one of the samples of the valid audio frame preceding the lost audio frame;

generating the substitution frame based on the audio filter and the samples of the valid audio frame preceding the lost audio frame, wherein the substitution frame is generated by using ringing of the resonator for extending the at least one sample into the lost audio frame;

inserting the substitution frame into the audio signal; and rendering the audio signal with the substitution frame.

3. A non-transitory computer-readable medium storing instructions that, when executed by one or more processors, cause the one or more processors to perform a method of generating a substitution frame for a lost audio frame of an audio signal, the method comprising:

determining an audio filter based on samples of a valid audio frame preceding the lost audio frame, wherein the audio filter is tuned on the samples of the valid audio frame preceding the lost audio frame;

modifying the audio filter to include bandwidth sharpening;

operating the audio filter as a resonator, wherein ringing of the resonator is initially excited with at least one of the samples of the valid audio frame preceding the lost audio frame;

generating the substitution frame based on the audio filter and the samples of the valid audio frame preceding the lost audio frame, wherein the substitution frame is generated by using ringing of the resonator for extending the at least one sample into the lost audio frame;

inserting the substitution frame into the audio signal; and rendering the audio signal with the substitution frame.

* * * * *